(12) United States Patent
Schmitt et al.

(10) Patent No.: US 8,792,592 B2
(45) Date of Patent: Jul. 29, 2014

(54) FEED-FORWARD CARRIER RECOVERY SYSTEM AND METHOD

(75) Inventors: Dirk Schmitt, Villingen (DE); Wen Gao, West Windsor, NJ (US); Paul Gothard Knutson, Lawrenceville, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/138,953

(22) PCT Filed: May 28, 2010

(86) PCT No.: PCT/US2010/001577
§ 371 (c)(1),
(2), (4) Date: Oct. 29, 2011

(87) PCT Pub. No.: WO2010/138205
PCT Pub. Date: Dec. 2, 2010

(65) Prior Publication Data
US 2012/0045028 A1 Feb. 23, 2012

Related U.S. Application Data

(60) Provisional application No. 61/217,333, filed on May 29, 2009.

(51) Int. Cl.
| | |
|---|---|
| H04L 27/00 | (2006.01) |
| H04L 7/00 | (2006.01) |
| H03K 3/00 | (2006.01) |
| H04W 56/00 | (2009.01) |
| H04L 27/26 | (2006.01) |
| H04L 7/10 | (2006.01) |
| H04H 40/90 | (2008.01) |
| H04L 7/04 | (2006.01) |

(52) U.S. Cl.
CPC .............. *H04L 27/2678* (2013.01); *H04L 7/10* (2013.01); *H04L 2027/0053* (2013.01); *H04W 56/005* (2013.01); *H04L 27/2679* (2013.01); *H04H 40/90* (2013.01); *H04L 27/0014* (2013.01); *H04L 7/0062* (2013.01); *H04L 27/2613* (2013.01); *H04L 7/042* (2013.01); *H04L 27/2656* (2013.01); *H04L 2027/0067* (2013.01)
USPC ........................... 375/326; 375/354; 327/236

(58) Field of Classification Search
CPC ... H04L 1/0058; H04L 27/3405; H04L 1/242; H04L 27/2627; H04L 27/2649; H04L 2025/03496; H04L 27/2675; H04L 27/06; H04L 25/4902
USPC .................................. 375/326, 354; 327/236
See application file for complete search history.

(56) References Cited

U.S. PATENT DOCUMENTS 5,337,335 A * 8/1994 Cloetens et al. .............. 375/376

(Continued)

FOREIGN PATENT DOCUMENTS

CN 1541473 10/2004

(Continued)

OTHER PUBLICATIONS

Jonghe et al., "Cycle Slip Analysis of the M-TH Power NDA Feedforward Carrier Synchronizer for M-PSK Using Narrowband Postfiltering", Belgium, 1994.

(Continued)

*Primary Examiner* — Leon-Viet Nguyen
*Assistant Examiner* — Sarah Hassan
(74) *Attorney, Agent, or Firm* — Robert D. Shedd; Jeffrey M. Navon

(57) ABSTRACT

A method of feedforward phase recovery on a data stream is described. Phase estimation base points are calculated, at a phase detector, for each block of the received data stream. A current phase, at a phase interpolator, between two phase estimation base points. Data stream delays within the phase detector are matched with delays within the phase interpolator.

20 Claims, 10 Drawing Sheets

(56) References Cited

U.S. PATENT DOCUMENTS

| | | | |
|---|---|---|---|
| 5,513,209 A * | 4/1996 | Holm | 375/354 |
| 5,525,518 A * | 6/1996 | Lundsgaard et al. | 436/68 |
| 5,541,958 A * | 7/1996 | Ishizu | 375/326 |
| 5,727,027 A * | 3/1998 | Tsuda | 375/329 |
| 5,822,687 A * | 10/1998 | Bickley et al. | 455/226.1 |
| 5,875,215 A | 2/1999 | Dobrica | |
| 6,278,971 B1 * | 8/2001 | Inoue et al. | 704/205 |
| 6,348,826 B1 * | 2/2002 | Mooney et al. | 327/270 |
| 6,654,432 B1 * | 11/2003 | O'Shea et al. | 375/354 |
| 7,627,031 B2 * | 12/2009 | Yu et al. | 375/233 |
| 2002/0047665 A1 * | 4/2002 | Moon et al. | 315/368.13 |
| 2002/0126748 A1 | 9/2002 | Rafie et al. | |
| 2003/0155953 A1 * | 8/2003 | Hirata et al. | 327/236 |
| 2003/0185180 A1 | 10/2003 | Min et al. | |
| 2005/0123073 A1 | 6/2005 | Ginesi | |
| 2005/0271138 A1 | 12/2005 | Yu et al. | |
| 2006/0189295 A1 | 8/2006 | Adachi | |
| 2008/0219383 A1 | 9/2008 | Koslov | |

FOREIGN PATENT DOCUMENTS

| | | |
|---|---|---|
| EP | 1513308 | 3/2005 |
| JP | 2006237819 | 9/2006 |
| JP | 2008518571 | 5/2008 |
| WO | WO2006039550 | 4/2006 |
| WO | WO2006054993 | 5/2006 |

OTHER PUBLICATIONS

Meyr et al.: "Digital Communication reveivers: synchronization, channel estimation and signal processing". Chapter 6, pp. 410-415, 1998. Performance Analysis of Synchronizers. 6.5.4 Feed forward Synchronizers for Long Burst Operation and Continuous Operation.

Viterbi et al.: "Nonlinear estimation of PSK-modulated carrier phase with application to burst digital transmission," IEEE Transactions on Information Theory, vol. IT-29, pp. 543-551, Jul. 1983.

Kam et al.: "Maximum likelihood carrier phase recovery for linear suppressed-carrier digital data modulations", IEEE Trans. Commun., vol. COM-34, pp. 522-527, Jun. 1986.

Lee et al., "Robust Frame Synchronization for Low Signal-to-Noise Ratio Channels Using Energy-Corrected Differential Correlation", EURASIP Journal on Wireless Communications and Ntworking, vol. 2009 (2009), Article ID 345989, 2009, 8 pages.

Classen et al., "An all Feedforward Synchronization Unit for Digital Radio", 1993 IEEE, May 18, 1993.

Jonghe et al., "Cycle Slip Analysis of the M-TH Power NDA Feedforward Carrier Synchronizer for M-PSK Using Narrowband Postfiltering", Belgium, Nov. 1993.

Jonghe et al., "Cycle Slip Analysis of the NDA FF Carrier Synchronizer Based on the Viterbi & Viterbi Algorithm", 1994 IEEE, 1994.

Digital Video Broadcasting (DVB), User Guidelines for the Second Generation System for Broadcasting, Interactive Services, News Gathering and other Broadband Satellite Applications (DVB-S2), ETSI TR 102 376, V1.1.1., Feb. 2005.

Search Report Oct. 14, 2010.

* cited by examiner

FEED-FORWARD CARRIER RECOVERY SYSTEM AND METHOD

CROSS-REFERENCE TO RELATED APPLICATIONS

This application claims the benefit, under 35 U.S.C. §365 of International Application PCT/10/001577, filed May 28, 2010, which was published in accordance with PCT Article 21(2) on Dec. 2, 2010 in English and which claims the benefit of U.S. provisional patent application No. 61/217,333, filed May 29, 2009.

TECHNICAL FIELD

The present principles relate to a method and apparatus for implementing an improved feedforward carrier recovery scheme.

BACKGROUND OF THE INVENTION

Examples of frequently used feed-forward carrier recovery schemes using commonly known receiver designs and implementations are shown in Heinrich Meyr, et al., "Digital communication receivers: synchronization, channel estimation and signal processing."

SUMMARY OF THE INVENTION

These and other drawbacks and disadvantages of the prior art are addressed by the present principles, which are directed to methods and apparatus for fast cycle slip detection and correction for improved communications in satellite systems.

According to an aspect of the present principles, there is provided a method and apparatus for fast cycle slip detection and correction for improved communications in satellite systems.

A method of feedforward phase recovery and an apparatus that performs feedforward phase recovery on a data stream is described. Phase estimation base points are calculated, at a phase detector, for each block of the received data stream. A current phase, at a phase interpolator, between two phase estimation base points. Data stream delays within the phase detector are matched with delays within the phase interpolator.

The data stream may include data frames segmented into data blocks. Calculation of phase estimation base points may be performed by using a maximization of a likelihood function. Calculation of phase estimation base points includes calculating one of: a number of data symbols or a number of pilot symbols in each block; processing each data symbol or pilot symbol, at a matched filter; and calculating a carrier phase offset, at the phase detector, over a block of data symbols or pilot symbols. The number of data symbols or the number of pilot symbols is calculated by the equation:

$$N = \frac{64800}{M * 1440},$$

where M denotes the modulation factor, and the carrier phase offset is calculated by the equation $$\theta(n) = \arg\left(\sum_N z(nT) a^*(nT)\right),$$

where $z(nT)$ denotes the matched filter output for each pilot or sync symbol and $a(nT)$ denotes pre-known pilot or sync symbols at time $nT$.

The carrier phase offset may be calculated at a phase offset estimator. The carrier phase offset may be calculated using an algorithm represented by $F(|z(nT)|)e^{jarg=(nT)N}$.

The two phase estimation base points may be within a range defined by $|\theta(i-1)-\theta(i)|<\pi/M$, wherein M denotes the modulation factor.

Calculation of the two phase estimation base points may be performed at a sawtooth device. The sawtooth device may perform by using the equation $\theta''(i)=\theta''(i-1)+SAW(\theta'(i)-\theta''(i-1))$, where $\theta'(i-1)$, $\theta'(i)$ denotes the estimate of the phase offset in the (i−1)-th and the i-th blocks and where $\theta''(i-1)$, $\theta''(i)$ denotes the corresponding un-wrapping values. Detecting and tracking out of phase variations may be performed at a post-processing block. Detecting and tracking out phase variations may be calculated using the equation: $\theta''(i)=\theta''(i-1)+\alpha \cdot SAW(\theta'(i)-\theta'(i-1))$ with $\alpha \leq 1.0$. Additionally, frequency estimation may be performed at a frequency estimation block.

These and other aspects, features and advantages of the present principles will become apparent from the following detailed description of exemplary embodiments, which is to be read in connection with the accompanying drawings.

DETAILED DESCRIPTION OF THE INVENTION

Figure 1:
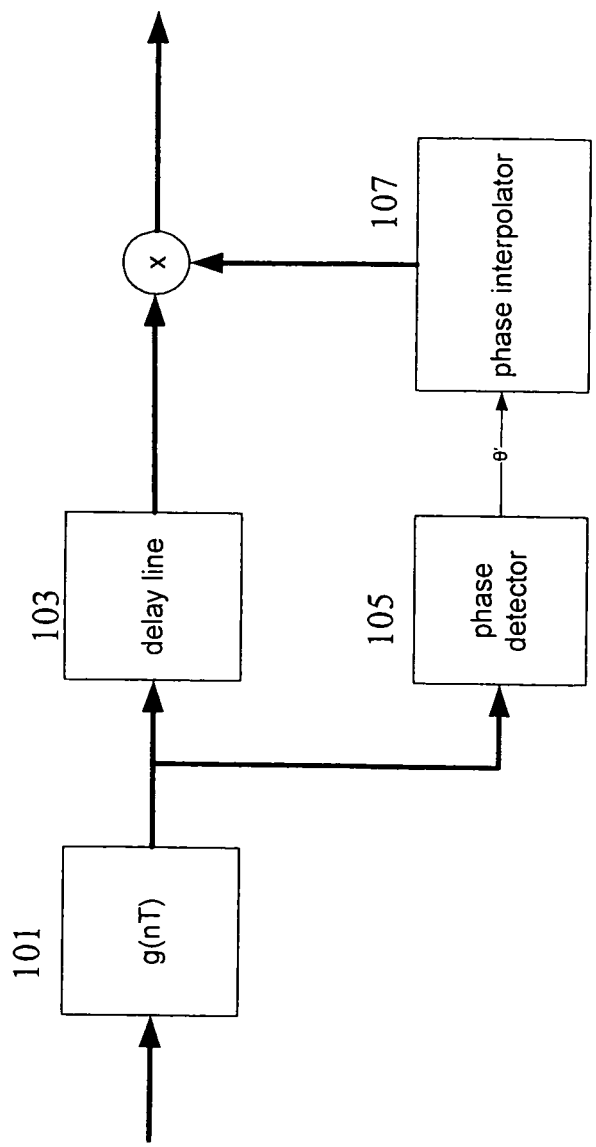
FIG. 1 shows a diagram of an exemplary feed-forward carrier recovery circuit.

Features and aspects of described implementations may be adapted for other implementations. Although implementations described herein may be described in a particular context, such descriptions should in no way be taken as limiting the features and concepts to such implementations or contexts.

The implementations described herein may be implemented in, for example, a method or process, an apparatus, or a software program. Even if only discussed in the context of a single form of implementation (for example, discussed only as a method), the implementation or features discussed may also be implemented in other forms (for example, an apparatus or program). An apparatus may be implemented in, for example, appropriate hardware, software, and firmware. The methods may be implemented in, for example, an apparatus such as, for example, a computer or other processing device. Additionally, the methods may be implemented by instructions being performed by a processing device or other apparatus, and such instructions may be stored on a computer readable medium such as, for example, a CD, or other computer readable storage device, or an integrated circuit. Further, a computer readable medium may store the data values produced by an implementation.

As should be evident to one of skill in the art, implementations may also produce a signal formatted to carry information that may be, for example, stored or transmitted. The information may include, for example, instructions for performing a method, or data produced by one of the described implementations. The signal may take a variety of forms, including for example, the signal may be analog, digital, and the signal may be baseband or modulating a carrier frequency suitable for transmission. Further, the signal may be recorded on computer readable medium.

Additionally, many implementations may be implemented in one or more of an encoder, a pre-processor to an encoder, a decoder, or a post-processor to a decoder. The implementations described or contemplated may be used in a variety of different applications and products. Some examples of applications or products include set-top boxes, cell phones, personal digital assistants (PDAs), televisions, personal recording devices (for example, PVRs, computers running recording software, VHS recording devices), camcorders, streaming of data over the Internet or other communication links, and video-on-demand.

Further, other implementations are contemplated by this disclosure. For example, additional implementations may be created by combining, deleting, modifying, or supplementing various features of the disclosed implementations.

The present arrangement provides a method and apparatus for improving the performance of frequently used feed-forward carrier recovery schemes. Feed-forward carrier recoveries are sensitive to phase variations. The present arrangement advantageously provides a solution for a trade off between large range frequency capture and small self-noise in the phase recovery stage, thus providing improved performance. In a traditional feedback phase recovery scheme, in order to achieve a large frequency acquisition range, self-noise is increased as a result. The increase in self-noise affects the performance of the phase recovery circuitry during the tracking phase. In the feed forward system described using present principles, a large frequency acquisition range may be achieved with minimal self noise.

In an embodiment, feed forward (FF) phase recovery is used. The received data is segmented into blocks and phase estimation is carried out for each block. A trial or calculation is performed on each block using a maximization of a likelihood function to ensure that phase estimates between the individual blocks are independent. The maximization of a likelihood function represents the joint probability of the block of symbols conditioned on a phase offset. Thus, cycle slips are prevented from occurring as fluctuations on the stable operation points are averaged over a block of received data. An exemplary FF carrier recovery diagram is shown in FIG. 1. Symbols are matched and filtered at matched filter (g(nT)) 101 to obtain z(nT) which represents the output of matched filter 101. Subsequently, z(nT) is passed through a phase detector 105 which estimates carrier phase offset over a given block length by maximizing an objective function or maximization of a likelihood function. Matched filter 101 functions by attempting to match the transmitted filter in order to reduce noise in the received signal. An estimated phase, θ' is passed from phase detector 105 to a phase interpolator 407 in order to set the current phase between two phase estimation base points. A more detailed discussion of how the phase is estimated is given in the paragraphs below corresponding to equation (2). A delay line 103 is used to match the respective delays inside the phase detector and phase interpolation. Two phase detection approaches used to find a maximum likelihood phase offset are discussed below. Two approaches may be necessary as phase detection may be data aided or non data aided.

Figure 2:
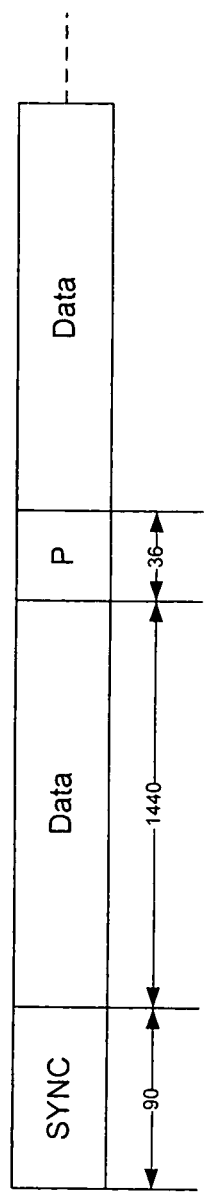
FIG. 2 shows an exemplary data stream compliant with the DVB-S2 standard FECFRAME structure.

A first phase detection approach is a data-aided approach in which known symbols such as pilot or sync symbols within a transmitted data steam are used to estimate the phase offset. An exemplary data stream compliant with the DVB-S2 standard FECFRAME structure is shown in FIG. 2. The FECFRAME includes a 90 symbol sync header followed by a block of 1440 data symbols. After each block of 1440 data symbols, is an optional block of 36 pilot symbols inserted within the stream. Since the FECFRAME has a fixed data length of 64800 data bits which are mapped using different modulation formats, such as quadrature phase shift keying (QPSK) or 16 asymetric phase shift keying (APSK), the total number of symbols in each FECFRAME is different. The following equation is used to calculate the number of data blocks in each FECFRAME for different modulation formats:

$$N = \frac{64800}{M*1440} \qquad (1)$$

If QPSK or 16APSK modulation is used, only a half or a quarter of the 1440 symbols are in the last data block. M denotes a modulation factor dependent on what type of phase shift keying is used. For example, for BPSK, M=1, for QPSK, M=2, for 8PSK, M=3, and for 16-APSK, M=4. This fact must be taken into account during the alignment of the recovered phase and the input data.

The DA (data-aided) phase detector represented as phase detector 105 in FIG. 1 is represented by $$\theta(n) = \arg\left(\sum_N z(nT)a^*(nT)\right) \qquad (2)$$

where N denotes the number of pilot or sync symbols in each block, z(nT) denotes the matched filter output for each pilot or sync symbol and a(nT) denotes the pre-known pilot or sync symbols at time nT. The pilot and sync symbols are not passed through delay line 103.

In a second phase detection approach a phase offset estimator is used. This phase offset estimator, within phase detector 105, is used for data-aided phase recovery, simplifies the calculation process and improves the performance of the M-th power phase detector by using an arbitrary function on the magnitude. The phase detector algorithm is represented by $$F(|z(nT)|)e^{j\arg z(nT)M} \qquad (8)$$

where F( ) represents an arbitrary nonlinear function.

Figure 3:
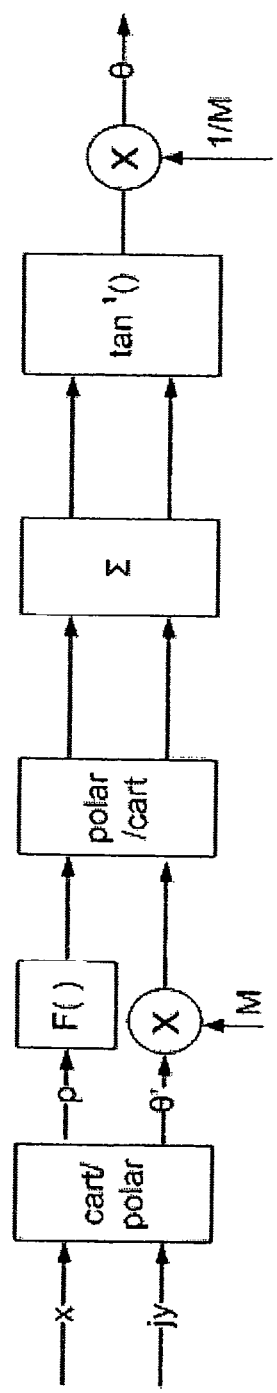
FIG. 3 shows a block diagram of an exemplary phase detector based on phase estimation carrier recovery.

A block diagram of an exemplary phase detector based on phase estimation carrier recovery is shown in FIG. 3. A major problem encountered using the FF carrier recovery approach is that phase dynamics due to phase noise and frequency offset are difficult to handle. If the carrier phase is changing in time due to a frequency offset, a traditional FF carrier recovery approach cannot follow this phase movement if the averaging process is too long or if the phase grows beyond the interval $[-\pi; \pi]$. To solve the problem of a phase growing beyond the detection bounds, an unwrapping algorithm is used. The unwrap algorithm is also restricted so that the phase difference between two blocks is represented by $$|\theta(i-1)-\theta(i)|<\pi/M \quad (9)$$

where M depends on the modulation format.

For pilot or sync symbols the value M is 1 since the offset binary phase shift keying (BPSK) modulation is used on these symbols. With M equal to 1, the unwrap algorithm finds the solution for phase variation tracking by using a non-linear sawtooth function to unwrap the phase increment between two blocks if the increment is inside the above defined bounds $[-\pi; \pi]$.

The aforementioned sawtooth function is represented by $$\theta'(i)=\theta''(i-1)+SAW(\theta'(i)-\theta''(i-1)) \quad (10)$$

where $\theta'(i-1)$, $\theta'(i)$ denotes the estimate of the phase offset in the (i−1)-th and the i-th blocks. $\theta''(i-1)$, $\theta''(i)$ denotes the corresponding un-wrapping values.

A post-processing block is used to detect and track out phase variations. The post processing block may be further improved to reduce the self noise of the phase detection by a further reduction of the variance of the feedforward estimate. Therefore the sawtooth output is weighted by a constant factor $\alpha$ and the post processing block is represented by $$\theta'(i)=\theta''(i-1)+\alpha\cdot SAW(\theta'(i)-\theta'(i-1)) \quad (11)$$

with $\alpha \leq 1.0$

An alpha value, which represents a variable for purposes of calculating phase variation, is selected based upon whether a particular feed-forward carrier recovery scheme is in an acquisition time period or a tracking time period. Alpha values are selected by using a first order frequency tracker. A first order frequency tracker is used to track frequency offsets. An indication of a time to switch between the acquisition phase and the tracking phase is given by a threshold detector and a timer. The factor $\alpha$ reduces the ability of the post processing to track out phase dynamics as the measured phase increment, related to the frequency offset, is shrunk linearly with respect to the $\alpha$ factor. A trade off between a small $\alpha$ value, which results in a small feed-forward post processing phase variation and a large $\alpha$ value, which can account for high phase dynamics is necessary and is described in the paragraphs below.

Figure 4:
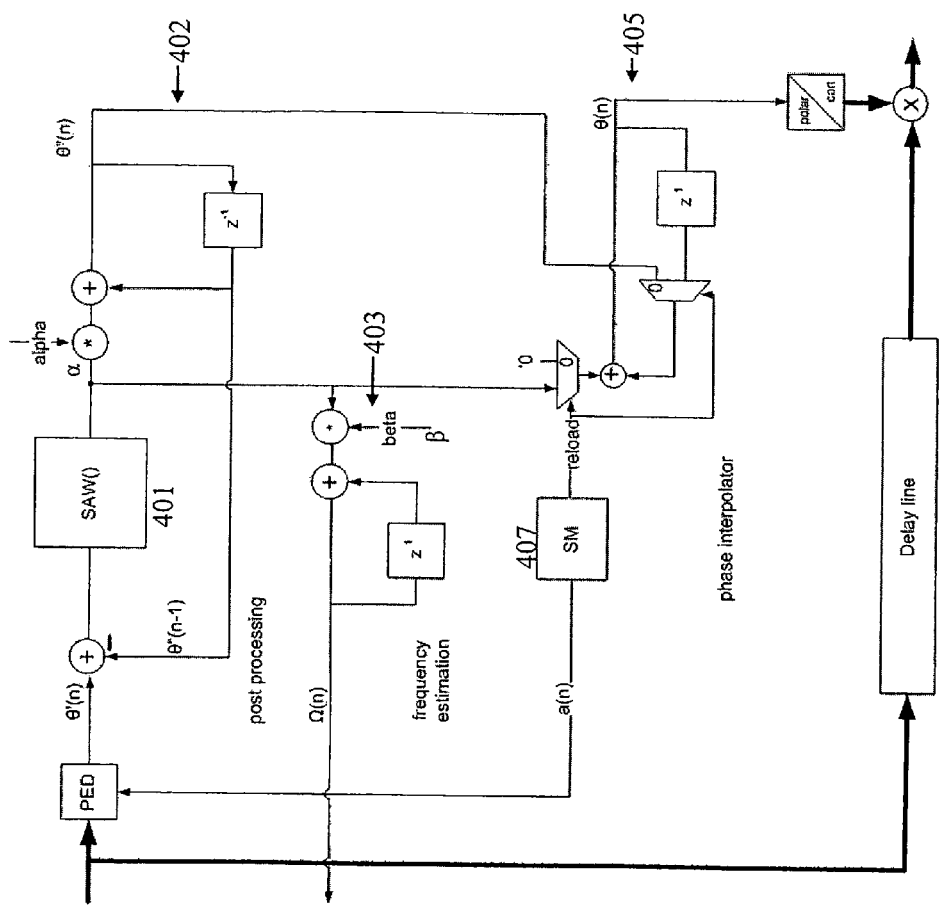
FIG. 4 shows a post processing block and frequency estimation block.

FIG. 4 shows the addition of a post processing block and a frequency estimation block to the hardware implementation shown in FIG. 1. The post processing block 402 receives an estimated phase from phase detector 405. The output of the sawtooth device 401 is connected to frequency estimation block 403. The sawtooth output from sawtooth device 401 is directly related to the phase increment between the two phase measurement blocks and the sawtooth output may be used to track out the remaining frequency offset using a first order frequency tracker, or frequency estimation block 403. The estimated frequency offset $\Omega(n)$ is then passed to an outer frequency correction circuit after processing by phase interpolator 405. The convergence speed of the frequency estimation process may adjusted by the $\beta$ parameter.

During an acquisition phase, where a high frequency offset is expected, the $\alpha$ value is set to 1.0 and $\beta$ value is also set to a high value. The value of $\beta$ is dependent on the delay between the outer frequency correction circuit and the post processing unit. $\beta$ may be adjusted to avoid oscillations. The variance of the sawtooth output may also be used to determine the $\beta$ value. After the acquisition phase the $\alpha$ value must be set to a small value to reduce self noise in the post processing block output. The $\beta$ value may also be reduced because high phase variations due to frequency offsets will no longer exist. The frequency estimation block 403 only has to follow small phase variations due to small frequency drifts which have very large time constants. To indicate the transition from acquisition to tracking mode, the level of the sawtooth output may be used. In this implementation a simple threshold detector is used to detect when the sawtooth output is below a certain value for a certain time (time to track), causing the $\alpha$ and $\beta$ coefficients to be switched from acquisition to tracking values.

Since the post processing block 402 gives one phase estimate for each pilot or sync block when the last pilot or sync symbol has passed, the linear phase interpolator 405 is used to determine the phase for each data symbol between each measurement epoch. Linear phase interpolator 405 is controlled by state machine (SM) 407, which reloads the linear phase interpolator 405 with the estimated phase and the estimated phase increment every measurement period. The interpolated phase $\theta(n)$ is then used in derotation logic to correct the delayed symbols.

Figure 5:
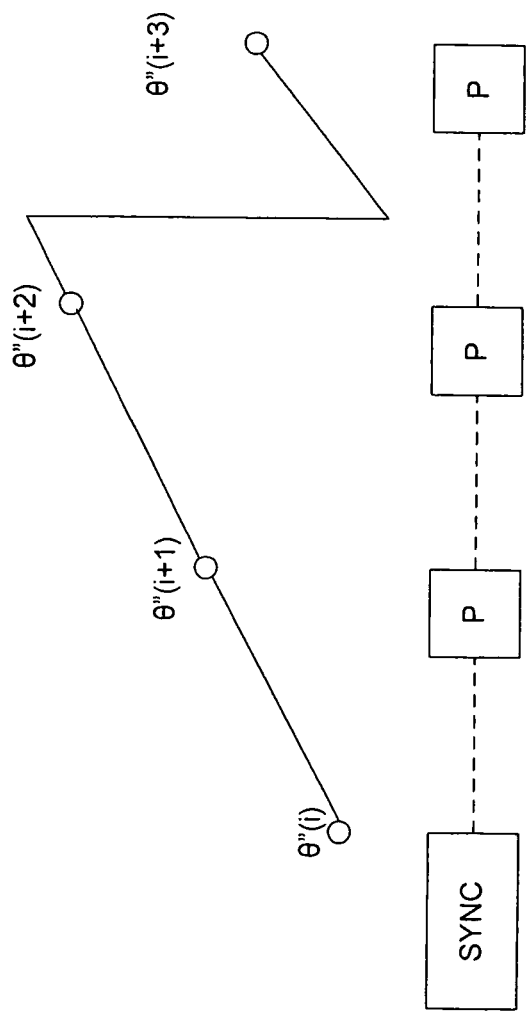
FIG. 5 shows the interpolation process for each phase measurement instance.
Figure 6:
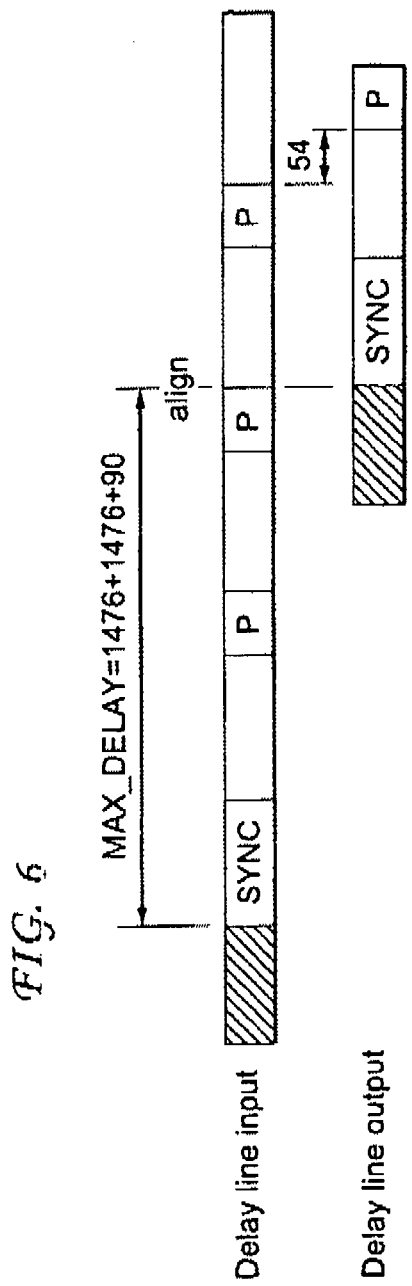
FIG. 6 shows an exemplary delay line input and delay line output.

FIG. 5 depicts the interpolation process which builds the trajectory between each phase measurement instance (P). As discussed above, a delay line must align with the phase trajectory built by interpolator 405 with the incoming symbols. FIG. 6 shows the delay line input and delay line output. The delay line output has a latency of the sync field SYNC, two data blocks and two pilot blocks P. The deep latency is necessary when a problem in QPSK and 16APSK modulation arises, where the data symbol block before a sync symbol block is much shorter due to the number of bits in each FECFRAME being constant.

Figure 7:
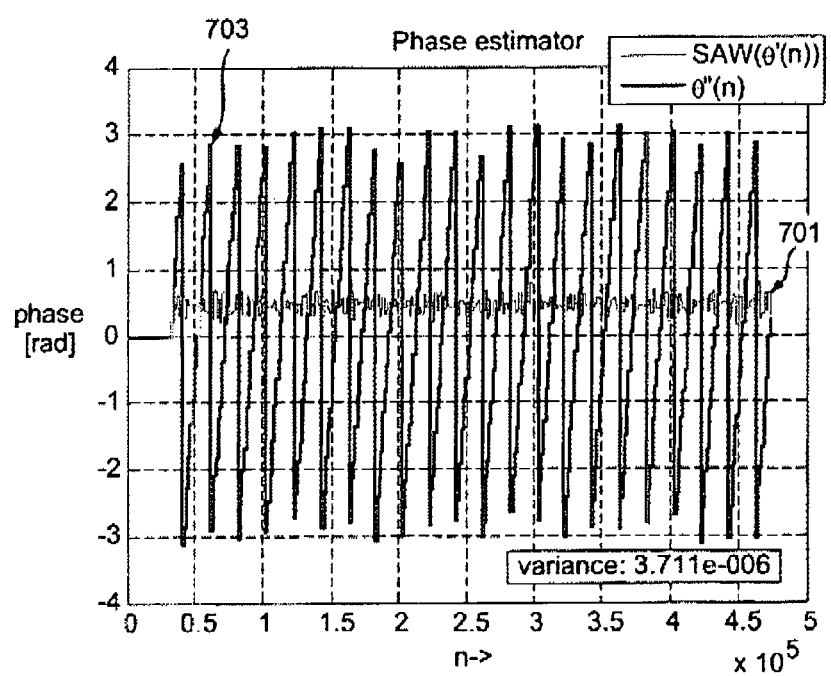
FIG. 7 shows a graphical representation of the output of the post processing unit and the output of the sawtooth function at 1 kHz frequency offset at 20 MBaud.

FIG. 7 shows the output of post processing unit 402 and the output of the sawtooth function from sawtooth device 401 for a 1 kHz frequency offset at 20 MBaud. The alpha value is set to 0.9 for exemplary purposes. The output of sawtooth device 401 is represented by SAW ($\theta'(n)$) line 701. The output of post processing unit 402 is represented by $\theta''(n)$ line 703. This illustrates that the variance after $\theta''(n)$ is very high at ~3.7e-6 rad while the offset of the sawtooth function output is very small with an average value of ~0.5 rad. With this particular alpha setting the post processing unit is able to handle up to approximately 6 kHz of frequency offset because the sawtooth function scale ranges from $[-\pi; \pi]$. The high variance of the post processing output introduces additional white self noise on the phase and consequently increases the phase noise floor.

Figure 8:
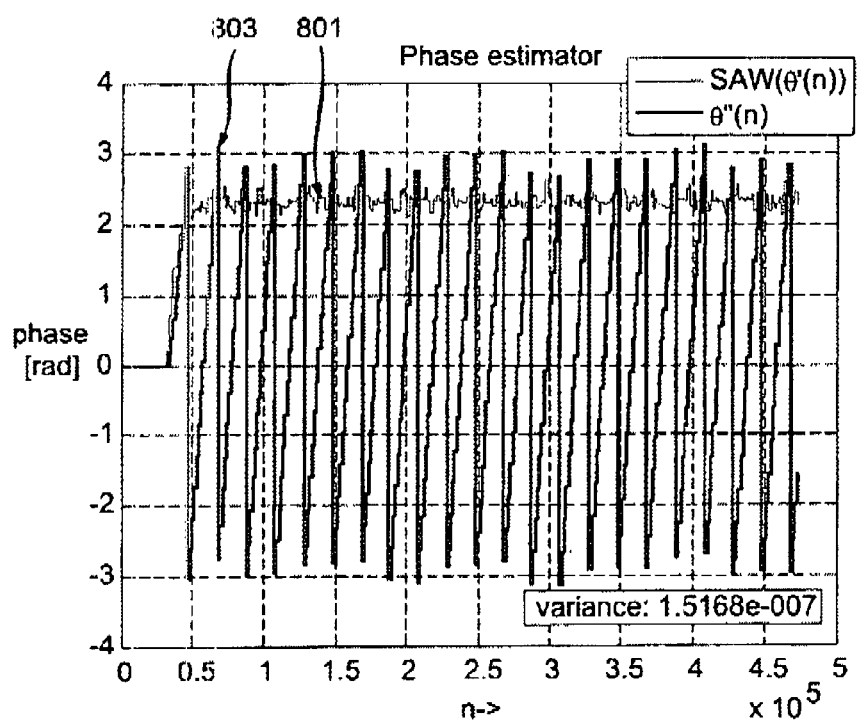
FIG. 8 shows a graphical representation of the results of the output of the post processing unit when the alpha value is set to 0.1.

FIG. 8 shows the results of the output of post processing unit 402 and sawtooth device 401 when the alpha value has been set to 0.1. The output of sawtooth device 401 is represented by SAW ($\theta'(n)$) line 801. The output of post processing unit 402 is represented by $\theta''(n)$ line 803. The sawtooth function output must increase in order to compensate for the linear factor of the smaller alpha value. At the same frequency offset of 1 kHz, this causes the sawtooth function to be close to saturation, establishing the maximum frequency offset that can be handled. If peak noise is given in the phase measurement process so that the sawtooth function also contains peaks, this may lead to an unwrap in the sawtooth function, especially if there is no margin between the sawtooth function maximum and the current average level of the sawtooth function output. A smaller alpha value causes a smaller variance of the post processing unit phase output and consequently a smaller self noise and a smaller phase noise floor in total.

Figure 9:
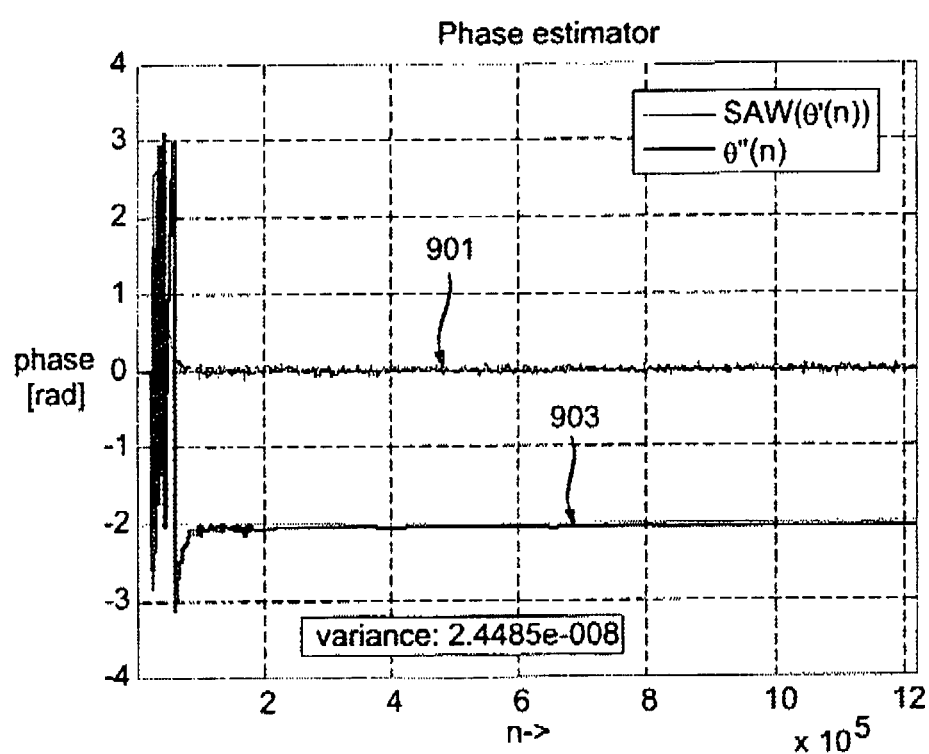
FIG. 9 shows a graphical representation of the phase variance based on a large alpha value selected for the acquisition time.

The time frame for performing phase estimation is split into two time frames. For the first time frame, the acquisition time, a large alpha value is selected and the frequency offset is leaked out after the sawtooth function via a feedback to the outer carrier recovery. This is shown in FIG. 9. The output of sawtooth device 401 is represented by SAW (θ'(n)) line 901. The output of post processing unit 402 is represented by θ"(n) line 903. During the acquisition phase (t<2e5 samples) the sawtooth output is decreased by the frequency offset leakage into the outer loop. In this situation, the alpha value is set to 0.9 and the leakage gain beta to the outer loop is set to 0.01. After the acquisition time the post processing output phase θ"(n) will stay at a constant level, which means that the entire frequency offset is tracked out. In the tracking phase (t>2e5 samples) the alpha value is switched to 0.05 as no further frequency offset needs to be tracked and the beta value is also reduced to 0.0001. The phase variance of the post processing output is strongly reduced to ~2.5e-8 rad. The output phase variance will be reduce further as the switch over from acquisition to tracking parameters causes very small oscillations which disturb the phase variance measurement. Measurements of the phase variance after 2e6 samples show that the phase variance is smaller then 1e-9 radians in this scenario.

Figure 10:
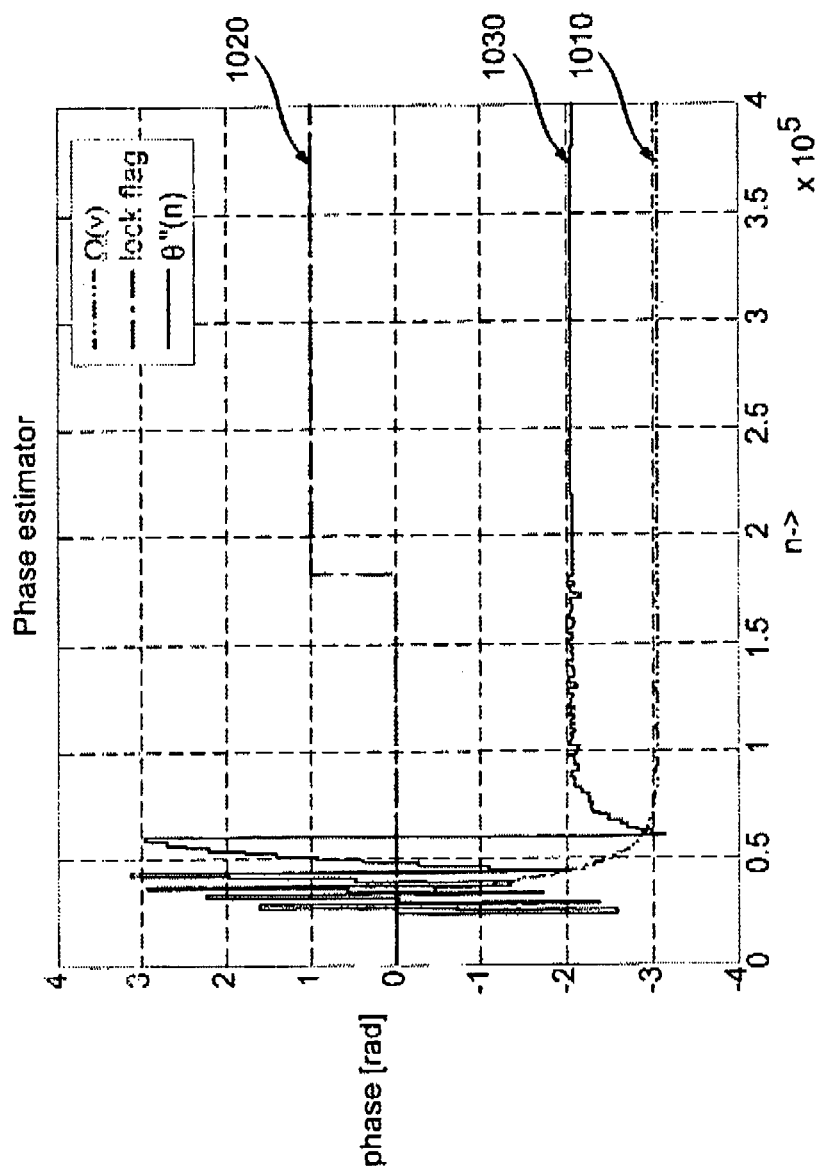
FIG. 10 shows a graphical representation of estimated frequency offset trackign using the modified post processing unit.

FIG. 10 shows how the estimated frequency offset Ω(n) is tracked in the modified post processing unit of the present arrangement in comparison with output phase θ"(n). The estimated frequency offset Ω(n) is represented by Ω(n) line 1010. The output phase θ"(n) is represented by θ"(n) line 1030. The estimated frequency offset has a first order tracking characteristic because a one-pole filter is used in the frequency tracker. Additionally, FIG. 10 shows the automatic tracking mode detector which is indicated by the lock flag. The lock flag is represented by lock flag line 1020. For the tracking mode detector the threshold of 0.1 is selected and the time to track is set to 10 measurement periods.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method of feedforward phase recovery on a data stream, wherein the data stream includes data frames segmented into data blocks comprising:
   calculating phase estimation base points, at a phase detector, for each block of the received data stream, comprising:
      calculating one of: a number of sync symbols and a number of pilot symbols in each block;
      processing each sync symbol or pilot symbol, at a matched filter; and
      calculating a carrier phase offset, at the phase detector, over a block of sync symbols or pilot symbols.
   setting a current phase, at a phase interpolator, between two phase estimation base points; and
   matching data stream delays within the phase detector with delays within the phase interpolator, wherein the number of said data blocks is calculated by the equation $$N = \frac{64800}{M*1440},$$

where M denotes the modulation factor, and the carrier phase offset is calculated by the equation $$\theta(n) = \arg\left(\sum_N z(nT)a^*(nT)\right),$$

where z(nT) denotes the matched filter output for each pilot or sync symbol and a(nT) denotes pre-known pilot or sync symbols at time nT.

2. A method of feedforward phase recovery on a data stream, comprising:
   calculating phase estimation base points, at a phase detector, for each block of the received data stream;
   setting a current phase, at a phase interpolator, between two phase estimation base points; and
   matching data stream delays within the phase detector with delays within the phase interpolator, wherein calculating the two phase estimation base points is performed at a sawtooth device, and wherein the sawtooth device uses the equation $\theta''(i)=\theta''(i-1)+SAW(\theta'(i)-\theta''(i-1))$, where $\theta'(i-1), \theta'(i)$ denotes the estimate of the phase offset in the (i−1)-th and the i-th blocks and where $\theta''(i-1), \theta''(i)$ denotes the corresponding un-wrapping values, and
   detecting and tracking out phase variations, at a post-processing block,
   wherein detecting and tracking out phase variations is calculated using the equation: $\theta''(i)=\theta''(i-1)+\alpha\cdot SAW(\theta'(i)-\theta'(i-1))$ with $\alpha \leq 1.0$.

3. The method of claim 2, further comprising estimating the frequency of the output of said sawtooth device at a frequency estimation block.

4. An apparatus that performs feedforward phase recovery on a data stream, comprising:
   a phase detector, that calculates phase estimation base points for each block of the received data stream;
   a phase interpolator, that sets a current phase between two phase estimation base points;
   a delay line, that matches data stream delays within the phase detector with delays within the phase interpolatorl; and
   a matched filter that calculates one of: a number of sync symbols and a number of pilot symbols in each block and processes each sync symbol or pilot symbol,
   wherein the phase detector calculates the two phase estimation base points over a block of sync symbols or pilot symbols, and wherein the number of said blocks is calculated by the equation $$N = \frac{64800}{M*1440},$$

where M denotes the modulation factor, and the carrier phase offset is calculated by the equation $$\theta(n) = \arg\left(\sum_N z(nT)a^*(nT)\right),$$

where z(nT) denotes the matched filter output for each pilot or sync symbol and a(nT) denotes pre-known pilot or sync symbols at time nT.

5. An apparatus that performs feedforward phase recovery on a data stream, comprising:
   a phase detector, that calculates phase estimation base points for each block of the received data stream;
   a phase interpolator, that sets a current phase between two phase estimation base points;
   a delay line, that matches data stream delays within the phase detector with delays within the phase interpolatorl;
   a sawtooth device that calculates the two phase estimation base points, wherein the sawtooth device uses the equation $\theta''(i)=\theta''(i-1)+SAW(\theta'(i)-\theta''(i-1))$, where $\theta'(i-1), \theta'(i)$ denotes the estimate of the phase offset in the (i−1)-th and the i-th blocks and where $\theta''(i-1), \theta''(i)$ denotes the corresponding un-wrapping values; and
   a post-processing block, that detects and tracks out phase variations from the output of the sawtooth device, wherein the post-processing block uses the equation:

$$\theta''(i)=\theta''(i-1)+\alpha\cdot SAW(\theta'(i)-\theta'(i-1)), \text{ with } \alpha \leq 1.0.$$

6. The apparatus of claim 5, further comprising a frequency estimation block, that estimates the frequency of the output from the sawtooth device.

7. The method of claim 3, wherein the convergence speed of the frequency estimation block is adjusted by a β parameter, wherein the value of said β depends on he delay between an outer frequency correction circuit fed by said frequency estimation block and said post processing block.

8. The method of claim 7, wherein the values of α and β are switched from acquisition values to tracking values.

9. The method of claim 8, wherein the values of α tracking values is smaller than the α acquisition value.

10. The method of claim 9, wherein the values of β tracking values is smaller than the β acquisition value.

11. The method of claim 8, wherein switching from acquisition to tracking values is based on a threshold detector.

12. The method of claim 11, wherein said threshold detector is based on the value of the sawtooth output.

13. The method of claim 12, wherein said threshold switching from acquisition to tracking value if the sawtooth output is below a certain value for a period of time.

14. The apparatus of claim 6, wherein the convergence speed of the frequency estimation block is adjusted by β parameter, wherein the value of said β depends on the delay between an outer frequency correction circuit fed 1by said frequency estimation block and said post processing block.

15. The apparatus of claim 14, wherein the values of α and β are switched from acquisition values to tracking values.

16. The apparatus of claim 15, wherein the α tracking values is smaller than the α acquisition value.

17. The apparatus of claim 15, wherein the β tracking values is smaller than the β acquisition value.

18. The apparatus of claim 15, further comprising a threshold detector for performing the switch from acquisition to tracking values.

19. The method of claim 18, wherein said threshold detector performs the switch based on the value of the sawtooth output.

20. The method of claim 19, wherein said threshold detector switches from acquisition to tracking value if the sawtooth output is below a certain value for a period of time.

* * * * *